United States Patent
Paxton et al.

(10) Patent No.: US 8,061,861 B2
(45) Date of Patent: Nov. 22, 2011

(54) METHOD FOR ILLUMINATING COLORS IN A BACKLIT DRIVER AIRBAG EMBLEM

(75) Inventors: Donald J. Paxton, Romeo, MI (US); Henry Vernon Phillips, Shelby Township, MI (US); Richard L. Matsu, Plymouth, MI (US)

(73) Assignee: Autoliv ASP, Inc., Ogden, UT (US)

( * ) Notice: Subject to any disclaimer, the term of this patent is extended or adjusted under 35 U.S.C. 154(b) by 122 days.

(21) Appl. No.: 12/290,105

(22) Filed: Oct. 27, 2008

(65) Prior Publication Data

US 2010/0102538 A1    Apr. 29, 2010

(51) Int. Cl.
*F21V 9/16* (2006.01)

(52) U.S. Cl. ........................... 362/84; 428/31

(58) Field of Classification Search ............. 362/84, 362/462; 280/728.3, 731; 428/31
See application file for complete search history.

(56) References Cited

U.S. PATENT DOCUMENTS

| | | | |
|---|---|---|---|
| 3,780,281 A | 12/1973 | Ohlhauser et al. | |
| 4,665,342 A | 5/1987 | Topp et al. | |
| 4,677,008 A | 6/1987 | Webb | |
| 4,684,353 A | 8/1987 | deSouza | |
| 5,516,143 A | 5/1996 | Lang et al. | |
| 5,558,364 A | 9/1996 | Davis | |
| 6,190,026 B1 * | 2/2001 | Moore | 362/487 |
| 6,701,652 B1 | 3/2004 | McElhatton et al. | |
| 6,787,990 B2 | 9/2004 | Cok | |
| 6,905,788 B2 | 6/2005 | Tyan et al. | |
| 6,986,918 B2 * | 1/2006 | Jacobs | 428/14 |
| 7,201,508 B2 | 4/2007 | Misaras | |
| 7,213,833 B2 * | 5/2007 | Amamori | 280/728.3 |
| 7,360,932 B2 | 4/2008 | Uken et al. | |
| 7,520,528 B2 * | 4/2009 | Nakamura et al. | 280/731 |
| 2003/0209889 A1 | 11/2003 | Erwin et al. | |
| 2004/0095739 A1 * | 5/2004 | Parker et al. | 362/26 |
| 2006/0125217 A1 | 6/2006 | Nakamura et al. | |
| 2008/0090031 A1 | 4/2008 | Hirzmann | |
| 2008/0225552 A1 * | 9/2008 | Capriola | 362/559 |
| 2009/0121459 A1 * | 5/2009 | Bostick et al. | 280/728.3 |
| 2009/0317571 A1 * | 12/2009 | Geracitano | 428/31 |

FOREIGN PATENT DOCUMENTS

| | | |
|---|---|---|
| DE | 298 20 304 U1 | 1/1999 |
| EP | 1 000 809 A1 | 5/2000 |
| EP | 1 787 867 A1 | 5/2007 |
| JP | 2000-118320 | 4/2000 |
| WO | WO-2007/084031 A1 | 7/2007 |

OTHER PUBLICATIONS

US 6,752,416, 06/2004, Kreuzer et al. (withdrawn)

* cited by examiner

*Primary Examiner* — Evan Dzierzynski
(74) *Attorney, Agent, or Firm* — Sally J. Brown; Madson IP (57) ABSTRACT

An airbag emblem may be backlit or illuminated to provide the emblem with greater visual appeal. In order to accomplish this illumination, an illumination source is used. This illumination source may be electroluminescent foil. The emblem includes colors that are added or inserted onto the emblem. These colors are translucent so that they may be illuminated by the illumination source. This emblem may be placed as part of an airbag cover on a steering wheel.

11 Claims, 10 Drawing Sheets

METHOD FOR ILLUMINATING COLORS IN A BACKLIT DRIVER AIRBAG EMBLEM

BACKGROUND OF THE INVENTION

Airbag systems are commonly used on vehicles and especially in steering wheels. These airbags are designed to inflate during an accident to prevent the occupant from harmful impact with the steering wheel during a crash. Accordingly, the airbag system will generally be positioned in the steering wheel.

It is also known that most vehicle manufacturers want to have their logo or trademark on the steering wheel. These logos or trademarks are often colored images and are positioned on the steering wheel (such as on the cover of the steering wheel that is used to cover the airbag system). Some logos may also have a metallic chrome portion for improved appearance. Such positioning of the logo fosters brand recognition and also helps the vehicle occupant to remember that cars made by the vehicle manufacturer have airbags and are thus safer.

In order to further make the company's logo "stand out," some parties have even begun to seek for ways to illuminate the logo/trademark. One example of this type of system is found in International Patent Publication No. WO 2007/084031, which document is expressly incorporated herein by this reference. However, to date there has not been an acceptable solution to illuminating the colored portion of a trademark in addition to a chrome/metallic portion. Such a solution would provide cosmetic benefits and would be desirable to many consumers.

BRIEF SUMMARY OF THE INVENTION

The airbag apparatus comprises an illumination source. The illumination source may comprise EL foil or may comprise a light guide illuminated by an LED. The airbag apparatus further comprises an emblem outline aligned with the illumination source, the emblem comprising an emblem outline. The emblem further including color plaques adjacent the emblem outline and disposed to form a colored emblem. The color plaques may be mounted on or inserted through the emblem opening. The emblem outline may comprise a front surface. The front surface may be painted or colored black (or dark) or any other color, as desired. In other embodiments, the emblem may comprise a translucent chrome portion protected by a coating finish.

The emblem outline may comprise one or more pockets for receiving the color plaques. In some embodiments, the color plaques are positioned on a back plate behind the front surface, the color plaques being inserted through openings in the emblem. In other embodiments, the emblem may comprise a dome, the emblem outline and color plaques being added to a rear surface of the dome.

In some embodiments, studs may be added to the emblem, the studs being connectable to an airbag cover. In other embodiments, the studs are added to the airbag cover, the studs being connectable to the emblem.

The apparatus includes an airbag cover that includes an emblem. The emblem is the logo or trademark of the vehicle manufacturer. The emblem may be formed from a molded, clear or tinted plastic materials. Behind the emblem will be an illumination source that is capable of "backlighting" or illuminating the emblem to increase the visual appeal of the design. In some embodiments, the illumination source comprises electroluminescent foil ("EL foil") or a light guide illuminated by an LED.

In some embodiments, the emblem may have a chrome portion. The background of the emblem may be black or dark to increase the emblem's visual appeal. The emblem may include an emblem outline and one or more color plaques. The emblem outline may be added to the front surface. The outline includes one or more pockets into which the color plaques may be placed. The color plaques may be small plaques of translucent colored plastic made from a variety of different materials, including various blends of acrylic or polycarbonate materials. When added, the plaques provide crisp delineation between the color and the chrome portion of the emblem. The backlighting for this emblem may then be provided by the illumination source, which may illuminate both the chrome portion and the color plaques.

Another embodiment of the emblem may be designed in which the emblem has holes in the front surface. The holes correspond to where the color belongs in the logo. Positioned behind the rear surface of the emblem is a back plate. The back plate includes the color plaques, which are raised, platform-like areas molded onto the back plate. The raised color plaques are then inserted through the holes. When inserted through the holes, the color plaques provide a crisp delineation between the chrome portion and the colored portion of the emblem.

Another embodiment of the emblem may be designed in which the emblem includes a crystal clear dome as the top surface. The raised, three-dimensional features of the emblem are positioned underneath the dome. On the back side of the dome is the emblem outline and the color plaques. The outline is machined into the back side of the dome. The plaques, when added to the outline, appear as raised platform-type areas on the back side of the emblem.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 2A and 2B are sketches that illustrate the way in which the emblem and the illumination source may be attached to the cover, wherein FIG. 2A shows the apparatus prior to welding and FIG. 2B shows the apparatus after the welding step;

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments, as represented in the Figures, is not intended to limit the scope of the invention, as claimed, but is merely representative of presently preferred embodiments of the invention.

Figure 1:
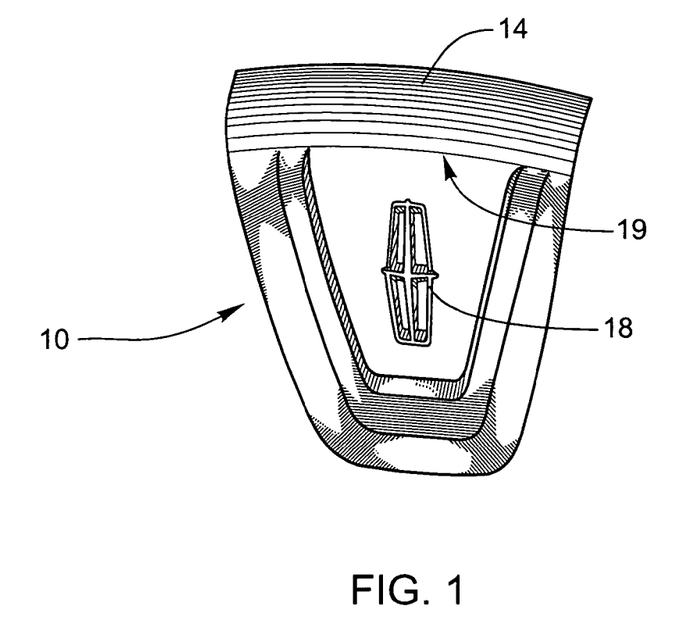
FIG. 1 is a front, perspective view of an airbag cover incorporating the present embodiments.

Referring now to FIG. 1, an airbag apparatus 10 that incorporates the present embodiments is illustrated. Specifically, the apparatus 10 includes an airbag cover 14 that may be used as part of a steering wheel airbag system. Those skilled in the art would appreciate how the apparatus 10 may be incorporated into the steering wheel. The cover 14 may be used to cover an airbag. In the event of an accident, the airbag will deploy through the cover 14.

The cover 14 includes an emblem 18. For example, the emblem 18 may be a logo or trademark of the vehicle manufacturer. As can be seen in FIG. 1, the emblem 18 is generally added to the center of the cover 14. The presence of the emblem 18 signifies to the consumer that the vehicle made by the particular manufacturer includes an airbag system. As will be described in greater detail herein, the emblem 18 may be backlit to illuminate the emblem 18, thereby making the emblem more visually appealing.

Figure 2:
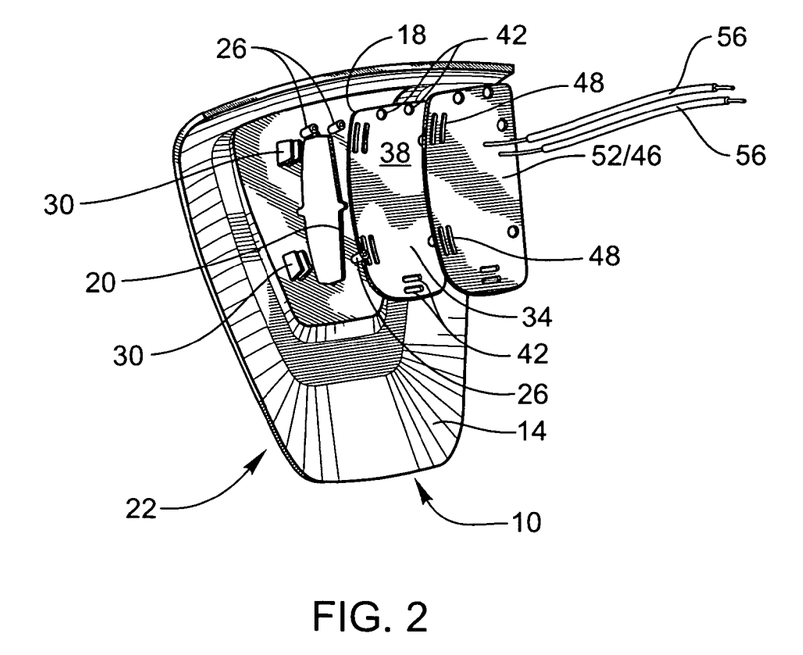
FIG. 2 is a rear assembly view of the airbag cover of FIG. 1.

FIG. 2 is an assembly view of the rear side 22 of the cover 14. As can be seen in FIG. 2, the cover 14 includes an opening 20 into which the emblem 18 will be inserted. The cover's rear side 22 may include one or more studs 26 and/or tabs 30. The emblem is added to a sheet 34 of material. In FIG. 2, the rear side 38 of this sheet 34 is visible; the emblem 18 is positioned on the front surface (not visible in FIG. 2) such that it will be inserted through and/or fit into the opening 20. The sheet 34 also includes one or more openings 42 that are sized and configured to engage the studs 26 and/or the tabs 30. In other words, the studs 26/tabs 30 will pass through the openings 42. As can be seen in the Figure, the cover may include one or more recesses 19. In fact, four recesses are shown. The cover 14 may include translucent or opaque colors. The translucent or opaque colors are in the four recesses shown. For example, for a "LINCOLN" brand car, the emblem color may be opaque black and for the "CADILLAC" cover, opaque black and translucent colors may be positioned on the inside of the shield in the logo.

The apparatus 10 further includes an illumination source 46 that is positioned rearward of the emblem 18. More specifically, the illumination source 46 is positioned rearward of the sheet 34. Like the sheet 34, the illumination source 46 comprises one or more openings 48 that are sized and configured to engage the studs 26 and/or the tabs 30. In other words, the studs 26/tabs 30 will pass through the openings 48. In this embodiment, the emblem is two-pieces, namely EL foil (shown below) and the sheet 34.

In the embodiment of FIG. 2, the illumination source 46 comprises electroluminescent foil 52 ("EL foil"). However, as described herein, other features may be used as the illumination source 46. Leadwires 56 are attached to the foil 52.

Figure 2A:
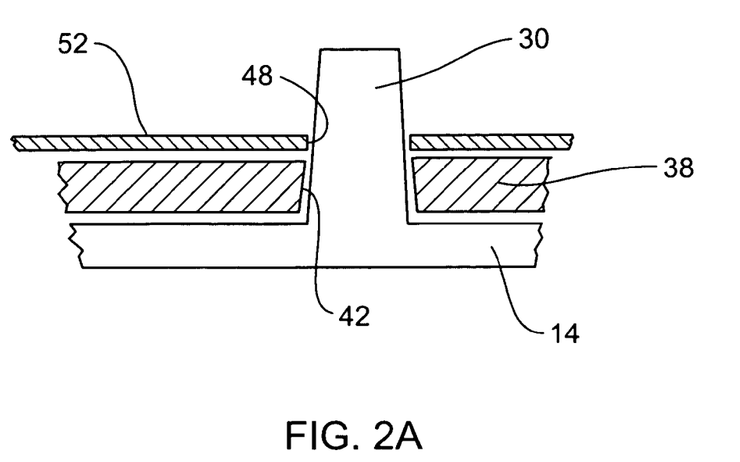
Figure 2B:
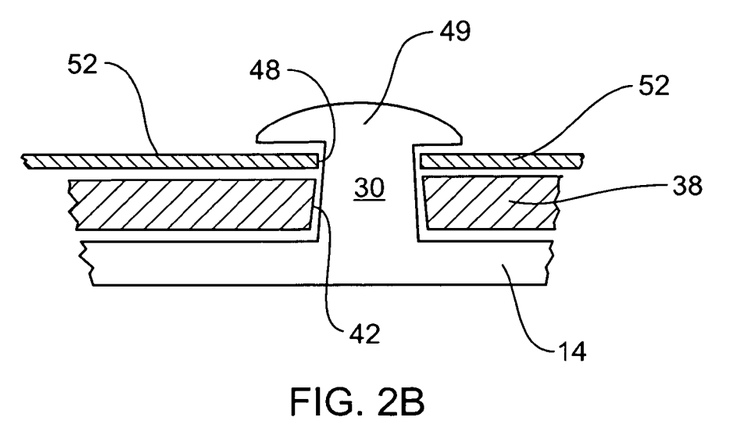
Figure 3:
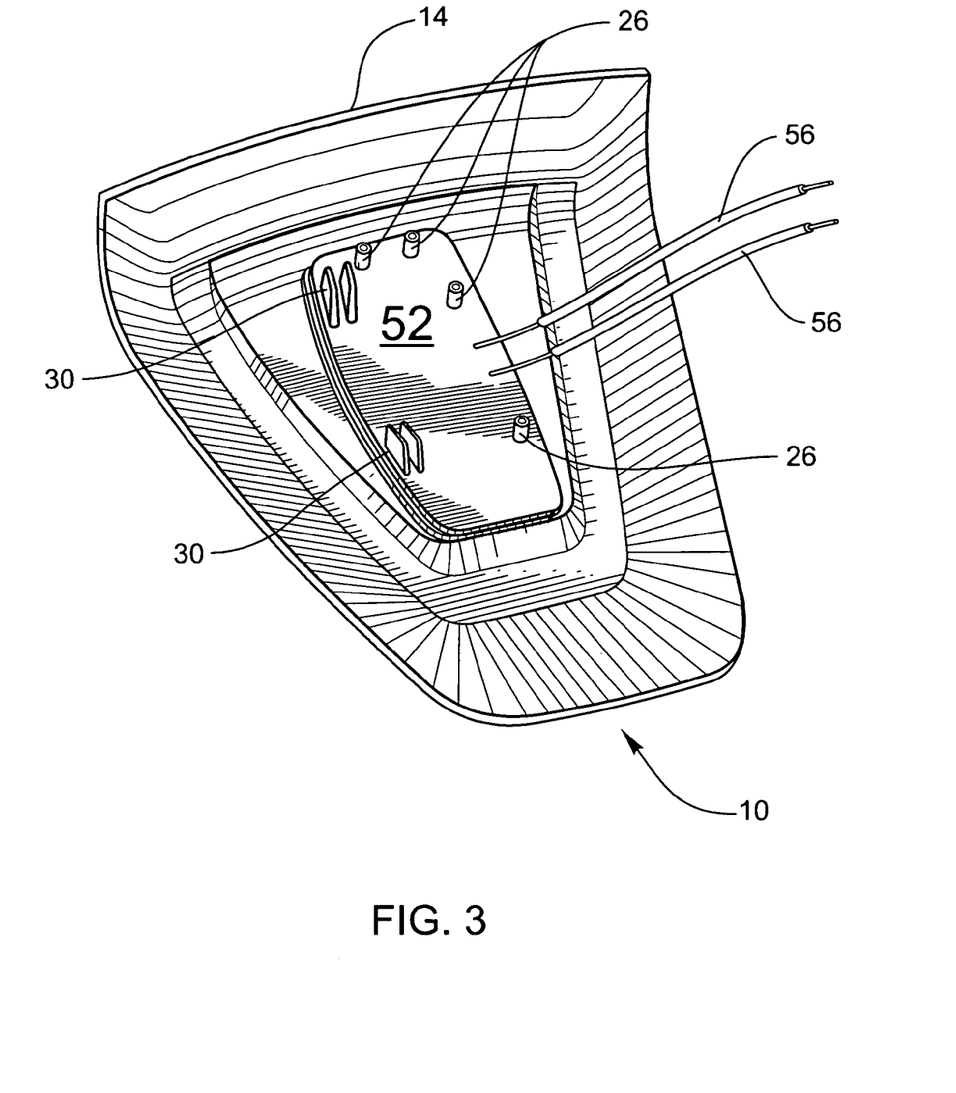
FIG. 3 is a rear, perspective view of the airbag cover of FIG. 2.

Referring now to FIG. 3, a perspective view shows the embodiment of FIG. 2 after it has been fully assembled. More specifically, in FIG. 3, studs 26 and tabs 30 have been passed through the openings 42 and the openings 48. Once assembled in this manner, the studs 26 and the tabs 30 may be ultrasonically welded over the EL foil 52 to securely attach the apparatus. This welding process is best understood with reference to FIGS. 2A and 2b taken in conjunction with FIG. 3. FIG. 2A shows tabs 30 passed through the respective openings 42, 48. In a like manner, the stud 26 (or the studs 132 described below) may similarly be passed through the openings. Once passed through, the tab 30 (or studs 26, 132) may be deformed with heat or other energy such as ultrasonic waves. Such deformation forms the "weld nugget" 49, which is the material that actually retains the emblem and light source 46 (light guide or EL foil 52). The weld "nugget" 49 is the material that is upset when the end of the attachment stud 26 or 132 or tab 30 is heated or deformed to secure the stud. Of course, other types of welding or attachment of the tab 30 may be used.

It should also be noted that a leadwire 56 may be attached to the EL foil 52. (The other end of the leadwire 56 will be attached as known in the art to allow for illumination of the emblem). Those of skill in the art would appreciate how and where this attachment of the leadwire 56 may be accomplished. In some embodiments, the leadwire 56 may be clipped into place either to the cover wall (such as the chute wall) or to the airbag module housing (or to other locations as desired). Such retaining the of the lead wire is shown in FIG. 3D. Basically, the leadwire needs to be routed from the emblem light source 52 to the outside of the airbag module. In this case the leadwire from the light source could route through the chute wall, clip onto the chute wall, or go inside the chute wall and snake its way out of the inside of the cover so that it may be connected to its power source. After the leadwire 56 has been connected between the EL foil 52 and power source, the EL foil 52 may provide backlight to illuminate the emblem 18.

Figure 3A:
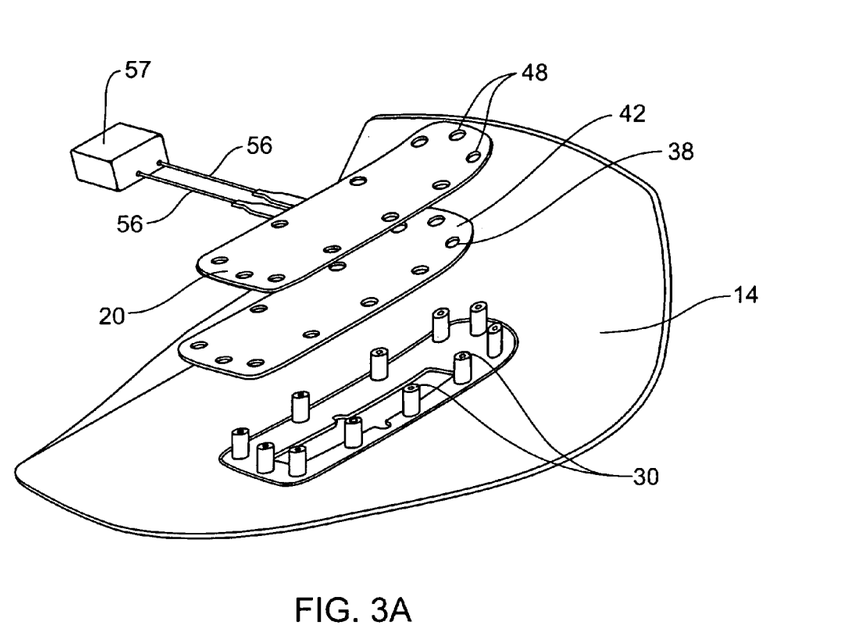
FIG. 3A is a rear, exploded, perspective view of another embodiment of an airbag cover.
Figure 3B:
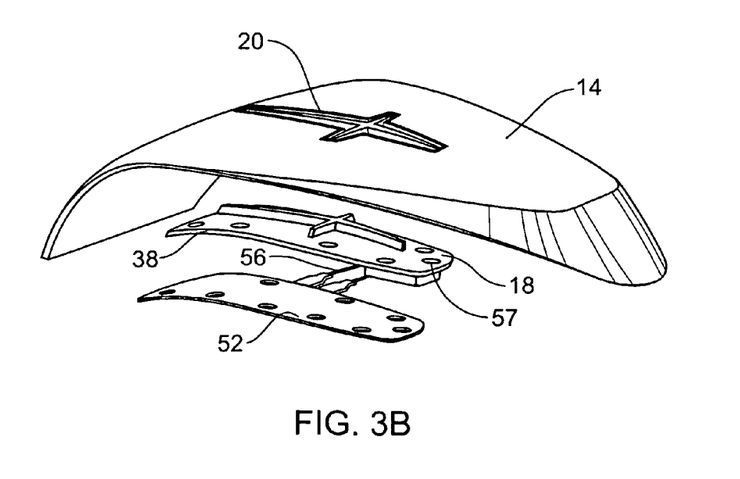
FIG. 3B is a side, exploded, perspective view of the embodiment of FIG. 3A.

FIGS. 3A and 3B shows another embodiment of the way in which the cover 14 may be illuminated. Specifically, FIGS. 3A and 3B shows EL foil 52 connected to wires 56 as well as a power source 57 (which may be a light source). The source 57 operates to illuminate the foil 52. The cover 14 includes posts 30 that fit through openings 42 and openings 48 as a means of securing the EL foil 52 and the emblem 38 to the cover.

Figure 3C:
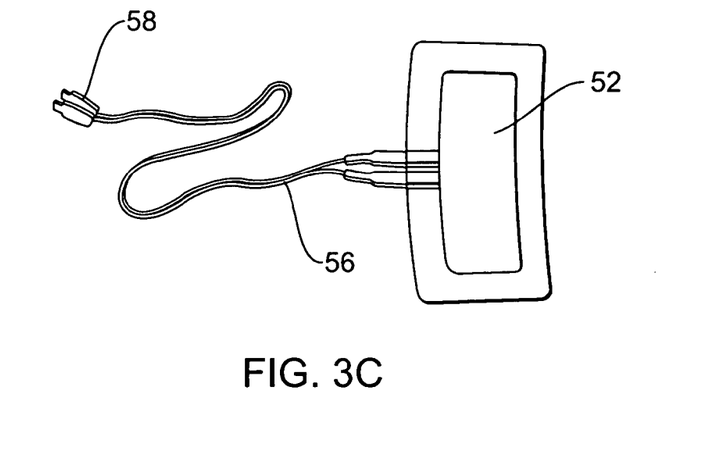
FIG. 3C is a perspective view of an embodiment of EL foil.
Figure 3D:
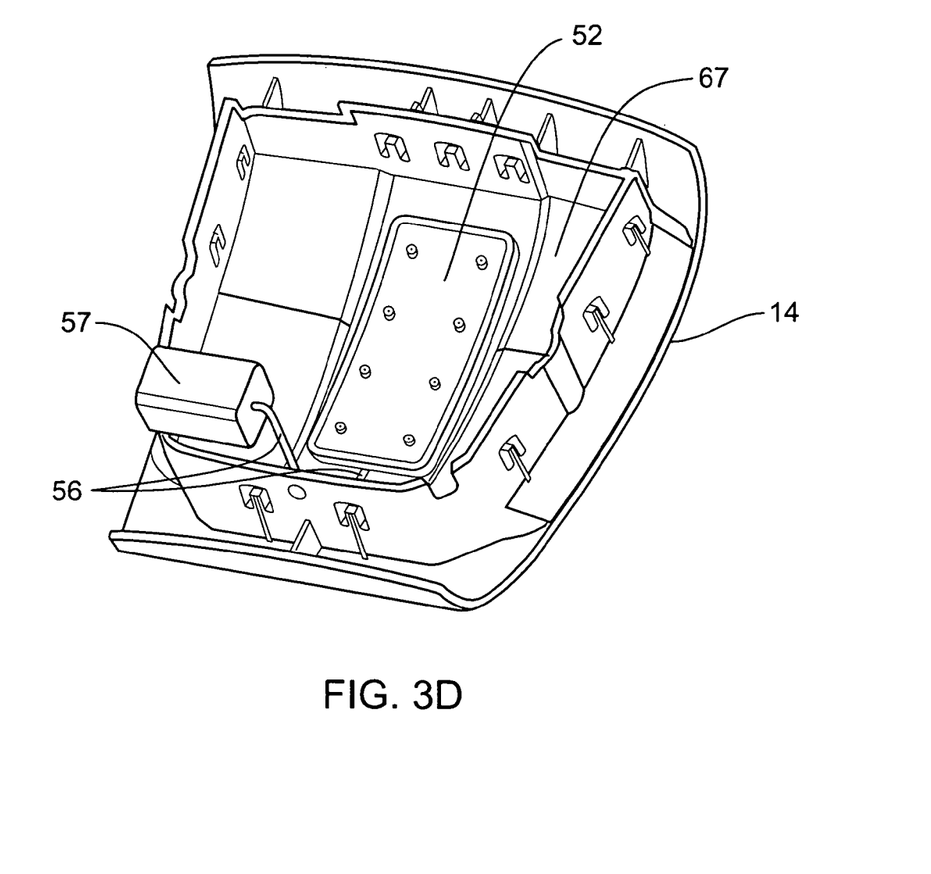
FIG. 3D shows a rear perspective of the embodiment of FIG. 3A of the cover.

FIG. 3C shows a perspective view of EL foil 52 that may be used in the present embodiments. The EL foil 52 includes only a single wire 56 and an attacher 58 that is capable of attaching to a source 57 (not shown in FIG. 3B).

FIG. 3D shows a rear, perspective view of the cover of FIG. 3A. This cover includes one or more walls 67 (which are sometimes referred to as "chute walls"). Also, in this embodiment, the wire 56 has been routed and stowed "out of the way" so that it is not dangling or getting in the way during airbag deployment or installation. One or more features, as known in the art, may be used to retain and hold the wire 56.

Figure 3E:
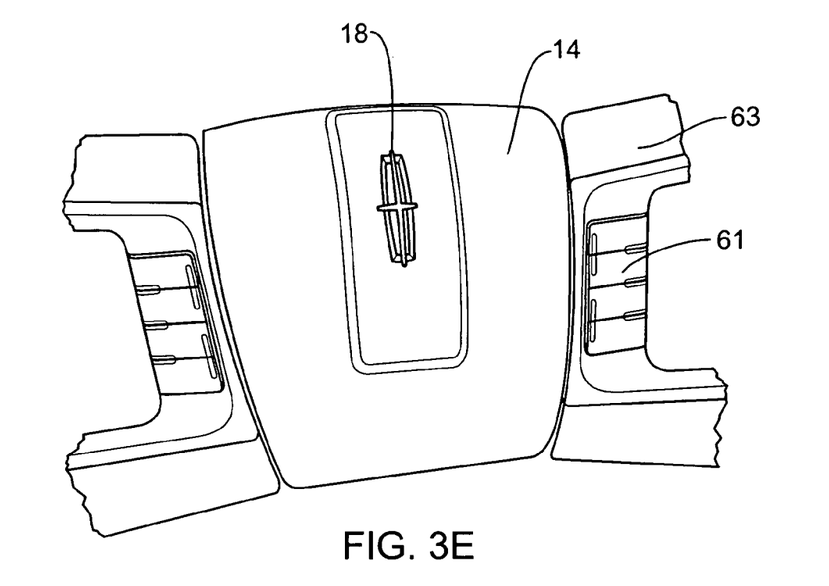
FIG. 3E shows an embodiment of the cover of FIG. 3A in use on a steering wheel.

FIG. 3E shows a frontal view of the embodiment of the cover 14 in use on a steering wheel 63. As shown in FIG. 3E, the cover 14 may be at or proximate the center of the wheel. One or more buttons (or switches) 61 may be used as part of the steering wheel 63.

Figure 4:
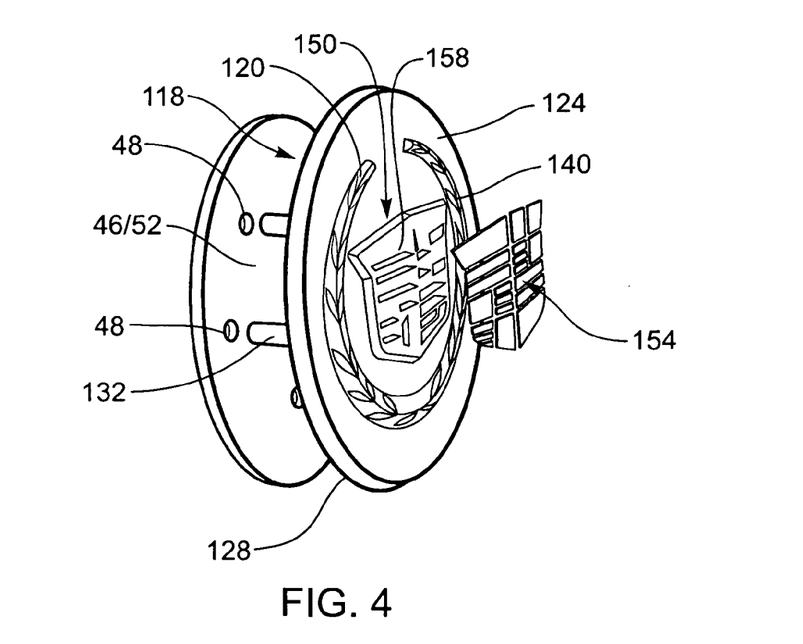
FIG. 4 is an assembly view of an embodiment of an emblem that may be used in the assembly of FIG. 1.

The way in which the emblem 18 may be formed will now be explained in greater detail. Specifically, FIG. 4 shows an assembly view of embodiment of how an emblem 118 may be made. This emblem 118 may then be used in the apparatus 10 shown above, as desired. By way of example, the emblem 118 is the "CADILLAC" logo that is commonly used on a certain type of vehicle.

The emblem 118 includes a front surface 124 and a rear surface 128. One or more mounting studs 132 protrude rearward from the rear surface 128. The mounting studs 132 may then be used to secure the emblem to the airbag cover. In the embodiment shown in FIGS. 1-3, the studs 32 were part of the cover 14 and openings 42 that receive the studs 32 were added to the sheet 34. In the embodiment of FIG. 4, the studs 132 are added to the emblem 118 and the corresponding openings 42 are on the cover (not shown). Of course, those skilled in the art will appreciate how each of these embodiments may be implemented.

The emblem 118 may also be used in conjunction with an illumination source 46. Again, in the embodiment of FIG. 4, this illumination source 46 comprises EL foil 52. The foil 52 may include openings 48 that receive the studs 132 and operate to connect the foil 52 to the emblem 118. Further ultrasonic welding may also be used to further secure the foil 52 as desired. The leadwire 56 (not shown in FIG. 4), may also be connected to the foil 52, as needed in order to allow the foil 52 to provide backlight illumination for the emblem 118.

The emblem 118 may be formed from molded, clear or tinted plastic materials. Such materials are currently used and are known to those in the industry. Some emblems 118 may have raised or recessed (i.e., three-dimensional) features. Such features may be formed during the molding process.

One of the features of the emblem 118 is that it has a chrome portion 140. This chrome portion 140 is a metallic or chrome section. As shown in FIG. 4, some logos or emblems have a metal or chrome portion as part of their overall design. If such a chrome portion 140 is required, this portion 140 is added to the front surface 124 so that it is visible to the user. The front surface 124 may also be painted black or dark, as having a black/dark background is a common feature of many emblems 118. Any other color may be selected as desired. Similarly, the emblem 118 may simply be molded out of the appropriate color as a means of providing the color for the front surface 124.

The emblem 118 may also include an emblem outline 150 and one or more color plaques 154. The emblem outline 150 may be added to the front surface 124. The outline 150 includes one or more pockets 158 into which the color plaques 154 may be added. The color plaques 154 may be small plaques of translucent colored plastic made from a variety of different materials, including various blends of acrylic or polycarbonate materials. Those skilled in the art would appreciate the materials that may be used. The color plaques 154 would provide crisp delineation between the color and the chrome portion 140 of the emblem.

It should also be noted that, in other embodiments, the plaques 154 comprise a colored liquid, such as a polyurethane resin or an acrylic resin. This liquid would be added/poured into the pockets 158 and allowed to harden within the pockets 158. Clearly, the arrangement of the colored plaques 154 depends upon the configuration and shape of the emblem 118 and the colors needed to form the emblem 118.

Regardless of the method selected of introducing the color plaques 154 into the pockets 158, the emblem 118 (and more specifically, the front surface 124, the outline 150, and/or the chrome portion 140) may have a PVD vacuum metalized chrome finish 120, along with a protective coating applied. Those skilled in the art are familiar with such "finishing" and "protecting" techniques. Such techniques may be performed either prior to or after the time that the color plaques 154 are added to the pockets 158. This finish is translucent and any light provided by the foil 52 will pass through the finish and illuminate the colored plaques 154 in the pockets 158.

Figure 5:
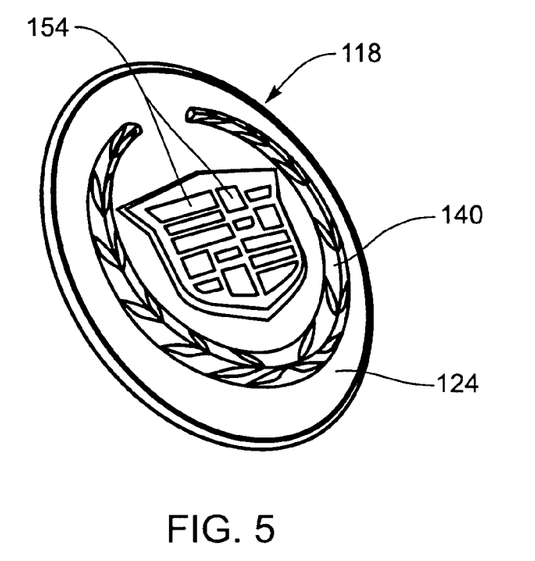
FIG. 5 is a fully assembled view of the emblem of FIG. 4.

Referring now to FIG. 5, the embodiment of the emblem 118 is illustrated in its fully assembled, fully finished state. This emblem may then be attached to and used as part of an airbag apparatus, as discussed above. The emblem 118 could then be illuminated via the illumination source 46 (not shown in FIG. 5). As described above, this illumination source 46 could be the EL foil 52 (not shown in FIG. 5) or, as described in the patent publication discussed above, could be a light guide illuminated by an LED. Because the colored plaques 154 (or plaque inserts) and the finish applied to the emblem 118 are translucent, the illumination provided by the source 46 will illuminate the plaques 154 and the chrome portion 140 (which may be translucent), thereby creating a visually appealing emblem 118. The translucent chrome 140 may be around all recessed color plaques, as shown in this drawings.

Figure 6:
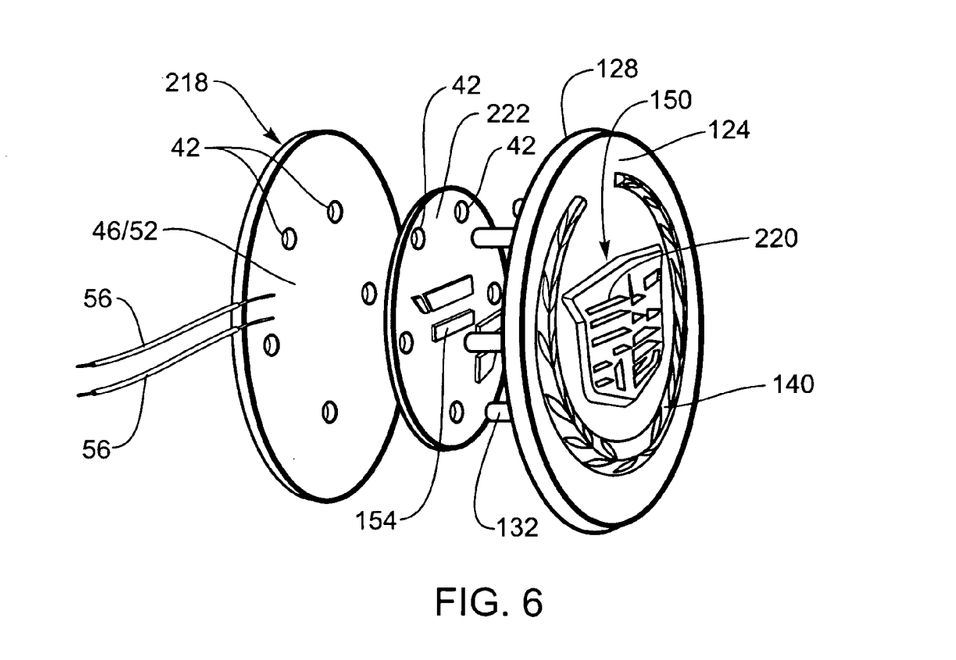
FIG. 6 is an assembly view of another embodiment of an emblem.

Referring now to FIG. 6, another embodiment of an emblem 218 is illustrated. The emblem 218 is similar to the embodiments discussed above. Accordingly, for purposes of brevity, this discussion will not be repeated.

In the embodiment of FIG. 6, the emblem 218 includes a front surface 124 and a rear surface 128. Again, the front surface 124 may be painted black or otherwise configured to have a dark color. However, in this embodiment, the emblem outline 150 is added to the front surface 124. However, there are openings 220 (sometimes referred to a "holes") in the emblem 218 that correspond to where the color should align for the emblem 218.

Positioned behind the rear surface 128 is a back plate 222. The back plate 222 comprises a portion of the emblem 218. The back plate 222 is made of a similar transparent material that is used to make the emblem 218. The back plate 222 includes the color plaques 154. However, in this case, the color plaques 154 are raised, platform-like areas molded onto or attached to the back plate 222. The raised color plaques 154 are then inserted through the holes 220 of the front surface 124. The raised color plaques 154 could easily be colored using known techniques such as painting or pad printing. (In other words, the back plate may have raised color platforms to insert into emblem hole 220). When inserted through the holes 220, the color plaques 154 provide a crisp delineation between the chrome portion 140 and the colored portion of the emblem 218. Windows or openings 220 go through the surface 124 to allow colors of the raised platforms of the inserts to show through.

As shown in FIG. 6, the illumination source 46, which may be EL foil 52, may be positioned behind the back plate 222 (and attached via the studs 132 discussed above). Wires 56 are shown attached to the EL foil 52. When fully assembled, the emblem 218 will have the same or similar appearance to that which is shown in FIG. 5. This emblem 218 may then be illuminated by the source 46, providing a visually appealing design. However, unlike some of the other embodiments described herein, the emblem 218 is illuminated without translucent chrome behind the color (or colored plaques).

Figure 7:
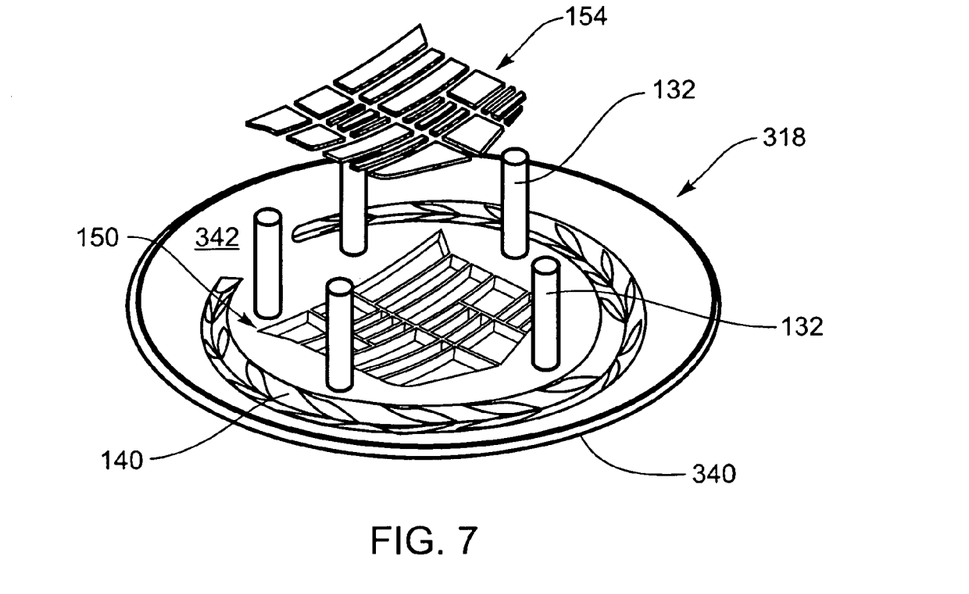
FIG. 7 is an assembly view of the backside of another embodiment of an emblem.

Referring now to FIG. 7, an assembly view illustrates another embodiment of an emblem 318 according to the present embodiments. The emblem 318 is similar to the embodiments discussed above. Accordingly, for purposes of brevity, this discussion will not be repeated.

Figure 8:
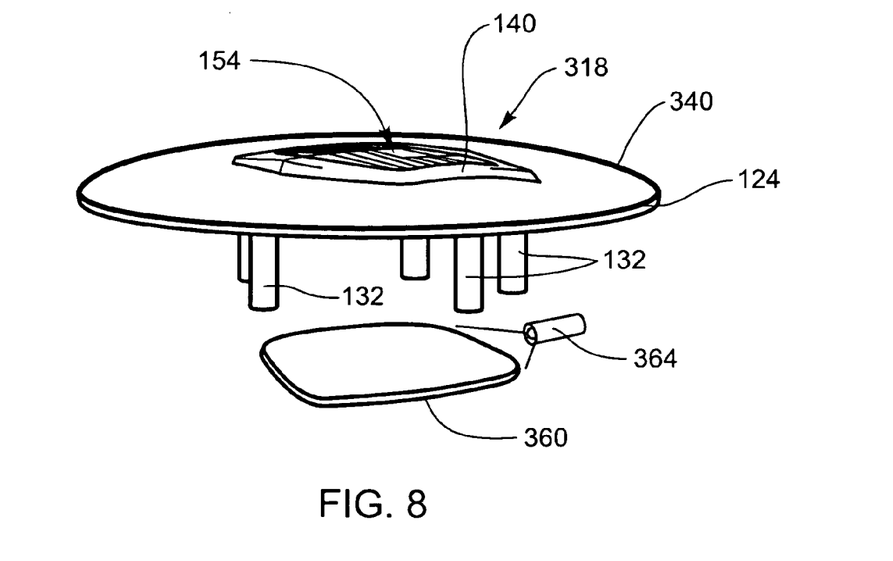
FIG. 8 is a frontside view of the emblem of FIG. 7 showing an alternative for illuminating the emblem.

In the embodiment of FIG. 7, the emblem 318 includes a clear dome 340. An emblem inverse image of the emblem geometry is embossed, engraved, molded or otherwise formed into the back side of the clear dome of the emblem 318—appearing as the normal image through the clear dome. The raised, three-dimensional features of the emblem 318 are positioned underneath the dome 340. In some embodiments, the dome 340 may be made of the same materials used to make other portions of the emblem 318. In other embodiments, the dome may be made of a crystal material and in yet further embodiments, may be a "crystal clear" dome. On the back side of the dome 340 is the emblem outline 150 and the color plaques 154. The outline 150 may be machined or otherwise formed into the back side 342 of the dome 340. The outline 150 may include individualized "pockets" for receiving the plaques 154. The plaques 154, when added to the outline 150, appear as raised platform-type areas on the back side 342 of the emblem 318. The color plaques 154 could easily be added using methods such as pad printing or painting. FIG. 8 shows the fully assembled emblem 318.

This method of forming the emblem 318 according to FIGS. 7 and 8 may be advantageous because the chrome portion 140 would be protected from scratching and marring by the dome 340. It should also be noted that the black portion (dark portion) of the front surface 124 could be insert molded into the dome 340. Although not strictly necessary, such molding may be desirable to hide the posts (studs) 132 on the back of the emblem 318. One or more holes 42 may be added to receive the studs 132.

It should be noted that, in the embodiment shown in FIG. 8, the illumination source comprises a light guide 360 illuminated by an LED 364. (These features are represented graphically by boxes). Again, those skilled in the art will appreciate that this type of illumination source is taught in the patent publication cited above. Of course, other types of structures capable of illuminating (backlighting) the emblem may be used as the illumination source.

Figure 9A:
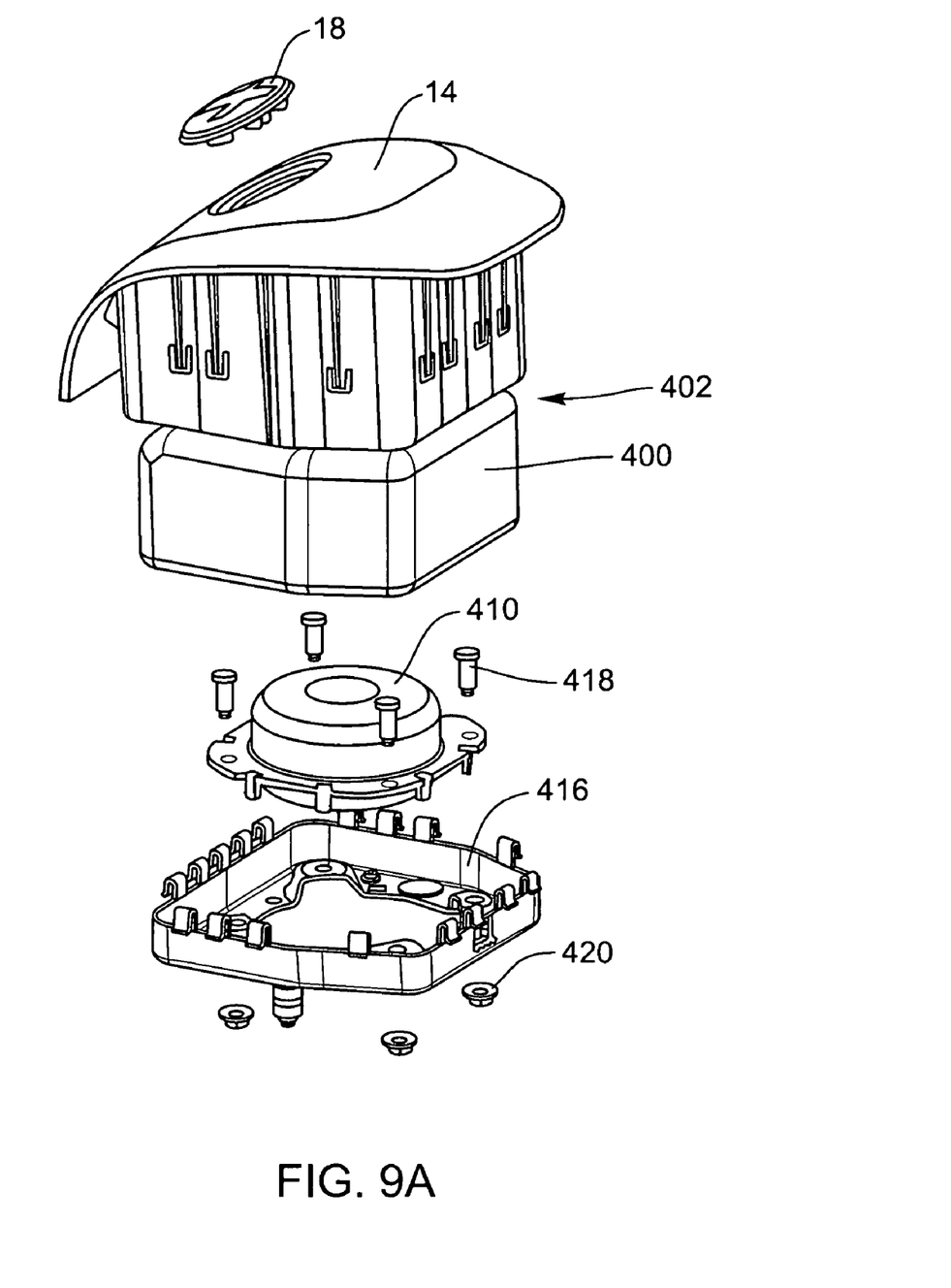
FIG. 9A is an exploded view of an exemplary driver's side air bag system.
Figure 9B:
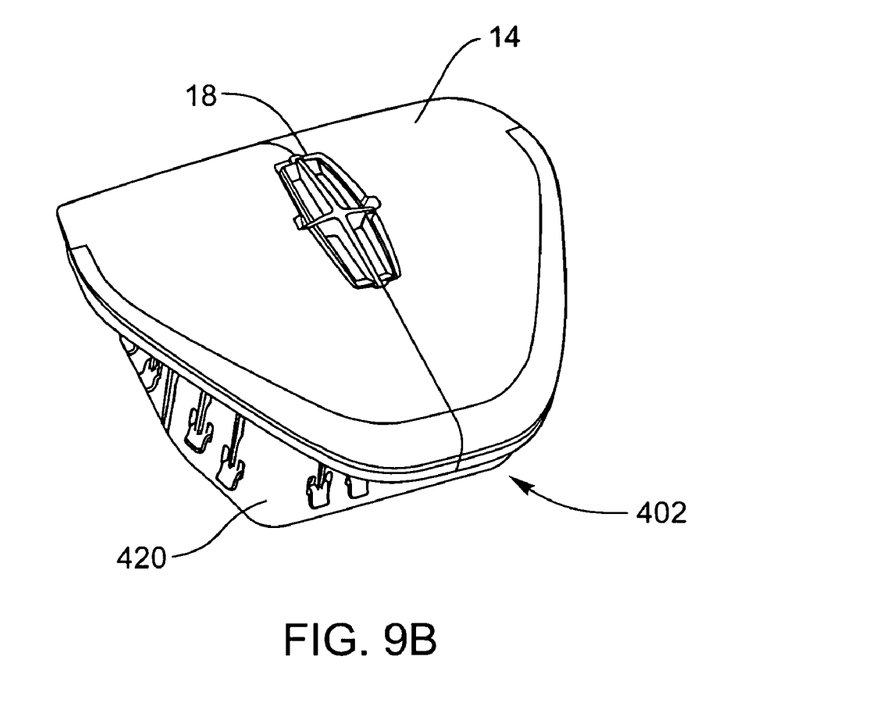
FIG. 9B is a perspective view of the top side of a fully-assembled, exemplary driver's side air bag system of FIG. 9A.
Figure 9C:
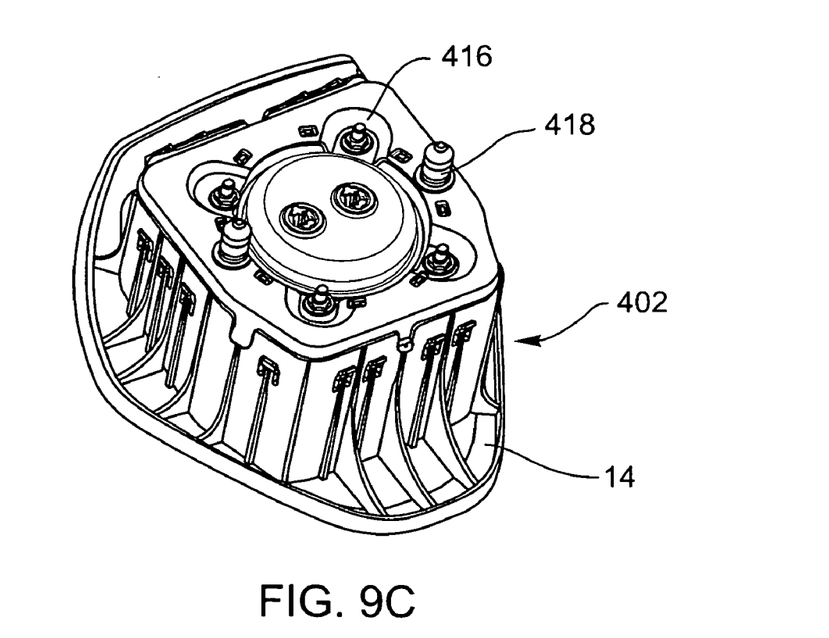
FIG. 9C is a perspective view of the underside of a fully-assembled, exemplary driver's side air bag system of FIG. 9A.

It should be noted that the above-described embodiments of airbag covers are designed for drivers' airbag system. An example of this airbag system 402 is shown in FIGS. 9A, 9B, and 9C. The system 402 includes the cover 14 (or any of the other airbag covers described herein). The system 402 includes an airbag 400 and an inflator 410 capable of inflating and deploying the airbag 400 during a crash. A retainer 416 is positioned below the inflator. Fasteners 418 and nuts 420 may be used to secure the retainer 415 to the inflator 410 and/or the airbag 400. Those skilled in the art will readily appreciate how this embodiment may be constructed, as well as other embodiments of an airbag system 402 that may incorporate the cover 14.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An airbag apparatus comprising:
   an illumination source; and
   a colored emblem aligned with the illumination source, the colored emblem comprising an emblem outline having at least one pocket, the colored emblem further comprising at least one translucent color plaque disposed within the at least one pocket, the at least one translucent color plaque is illuminated by light passing through the colored emblem from the illumination source.

2. An apparatus as in claim 1 wherein the illumination source comprises EL foil.

3. An apparatus as in claim 1 wherein the illumination source comprises a light guide illuminated by an LED.

4. An apparatus as in claim 1 wherein the at least one pocket of the emblem outline is disposed on a front surface of the colored emblem.

5. An apparatus as in claim 1 wherein the colored emblem has a front surface and the emblem outline comprises at least one opening, the at least one color plaque is positioned on a back plate disposed behind the front surface, each color plaque being inserted through one of the openings in the emblem outline.

6. An apparatus as in claim 1 wherein the colored emblem comprises a transparent dome, the at least one pocket of the emblem outline and each color plaque being disposed on the rear surface of the dome.

7. An apparatus as in claim 1 wherein the emblem outline comprises a translucent chrome portion protected by a coating finish.

8. An apparatus as in claim 1, further comprising studs on the colored emblem, the studs connectable to an airbag cover.

9. An apparatus as in claim 1 further comprising studs positioned on an airbag cover, the studs connectable to the colored emblem.

10. An emblem for connection to an airbag cover, the emblem comprising an emblem outline having a plurality of pockets and an illumination source aligned with the emblem, further comprising one or more translucent color plaques, each color plaque being disposed within one of the plurality of pockets of the emblem outline and being disposed so that at least a portion of the emblem is translucent for backlighting by light from the illumination source passing through the emblem.

11. An emblem as in claim 10 wherein the emblem outline has at least one opening for receiving one or more of the color plaques.

* * * * *